United States Patent [19]

Baker

[11] Patent Number: 4,936,811
[45] Date of Patent: Jun. 26, 1990

[54] BOOT ASSEMBLY FOR CONSTANT VELOCITY JOINT

[75] Inventor: W. Howard Baker, Hartsville, Tenn.

[73] Assignee: Wynn's-Precision, Inc., Lebanon, Tenn.

[21] Appl. No.: 325,416

[22] Filed: Mar. 20, 1989

[51] Int. Cl.⁵ ............................................. F16D 3/84
[52] U.S. Cl. ................................ 464/175; 277/212 FB
[58] Field of Search ..................... 277/212 FB; 403/50; 464/111, 173, 175, 905

[56] References Cited

U.S. PATENT DOCUMENTS

| | | | |
|---|---|---|---|
| 4,224,808 | 9/1980 | Gehrke | 464/175 |
| 4,280,340 | 7/1981 | Goguet | 464/111 X |
| 4,299,400 | 11/1981 | Tsuru | 277/212 FB |
| 4,320,632 | 3/1982 | Dore | 464/111 |
| 4,360,209 | 11/1982 | Ukai et al. | 464/175 |
| 4,379,706 | 4/1983 | Otsuka et al. | 464/905 X |
| 4,558,869 | 12/1985 | Grove et al. | 464/175 X |
| 4,735,596 | 4/1988 | Ukai et al. | 464/175 |
| 4,747,805 | 5/1988 | Welschof et al. | 464/175 |
| 4,767,381 | 8/1988 | Brown et al. | 464/173 X |
| 4,786,272 | 11/1988 | Baker | 464/175 |
| 4,795,404 | 1/1989 | Sutton et al. | 464/111 |

FOREIGN PATENT DOCUMENTS 73591 3/1983 European Pat. Off. ...... 277/212 FB

Primary Examiner—Daniel P. Stodola
Attorney, Agent, or Firm—Biebel, French & Nauman

[57] ABSTRACT

A flexible boot assembly and a device for retaining the boot on the housing of a trilobal-tripot constant velocity joint. The boot assembly comprising a flexible boot having a sleeve, the sleeve being formed to complementary fit the outer contour of the joint housing; a segmented band having an inner contour to complementary fit the outer contour of the sleeve and having a generally circular outer contour; and a clamp encircling the band for causing the sleeve to grip the joint housing.

14 Claims, 3 Drawing Sheets

BOOT ASSEMBLY FOR CONSTANT VELOCITY JOINT

BACKGROUND OF THE INVENTION

Constant velocity or CV joints, as used on automotive drive axles, such as on front wheel drive cars, are commonly enclosed within a convoluted polymer boot. Such convoluted boots, that is, boots having a plurality of axially spaced annular convolutions, are commonly formed with a small end which is retained by a clamp on the drive shaft leading out of the joint, and a large end clamped to an annular surface of the body of the CV joint. Such boots provide a seal for the joint over the operating range of the constant velocity joint.

Convoluted boots may be blow molded of rigid thermoplastic polyester elastomers by reason of their mechanical and physical strength over a wide variety of operating conditions, and generally by reason of their toughness and their ability to resist puncture or tearing. However, such blow molded elastomeric polymers are somewhat hard and stiff and can require a substantially large compressive clamping force to hold the large end of the boot in place on the body of the CV joint, without movement under the clamp, while still providing an effective seal between the boot and the body.

Typical materials from which blow-molded convoluted boots have been made are commonly referred to as thermoplastic elastomers (TPE) and include polyetherpolybutylterephalate compounds (PEPBT). Typical thermoplastic elastomer materials which are used for blow-molding convoluted boots, as defined above, include E. I. du Pont de Nemours and Company "Hytrel", HTG-5612 and Monsanto's "Santoprene" thermoplastic rubber, typically grade 103-40. Such elastomers, as compared to typical rubbers, have a substantially greater tendency to deform at relatively low elongation forces, and typically have a maximum or 100% modulus which is less than half of the ultimate tensile stress.

The relatively high stiffness of such blow-molded elastomers normally suggests the employment of a correspondingly heavier clamp with high clamping forces in order to hold the boot in place on the body, particularly when the boot is operated under angular offset conditions, such as on a constant velocity joint. This is especially the case at the large end of the boot, where the large inside diameter is clamped to the joint housing. In this instance, a combination of dissimilarities combine to make more difficult the clamping of such a convoluted boot, particularly at its larger end. These include (a) the large force required to compress TPE material, by reason of its substantial hardness as mentioned above; (b) the ability of the blow-molded TPE material to transmit axial loads onto the clamp; (c) the relatively inability of such TPE material to accept any high amount of tensile loads without permanent deformation; and (d) the tendency of the TPE blow-molded polymer material to cold flow under the clamp. For example, the compression set of E. I. du Pont de Nemours and Company "Hytrel" tested in accordance with ASTM-D395 method A, at 100° C. is 8%. However, rubber elastomers are normally tested under ASTM-D395 method B, which measures compression set under constant deflection. Such 8% compression set occurs at only about 9% strain and this would be translated as almost a 100% compression set by ASTM-D395 method B. This explains why, in service, most of the problems of sealing blow-molded TPE convoluted boots is that of the replacement of a clamp which has come loose.

A particular problem in sealing constant velocity joints with blow-molded boots resides in conforming a boot to the unusual configuration of closed tripod joints, often referred to a trilobal-tripot joints, of the kind shown in Sutton et al, U. S. Pat. No. 4,795,404 issued Jan. 3, 1989. The outer housing of this joint is not circular, but is formed with three equally spaced lobes. Typically the convoluted elastomer boot is attached to a trilobal-tripot constant velocity (TTCV) joint housing by placing a metallic can over an elastomeric bushing to achieve a cylindrical shape and by using a clamp to seal and secure the convoluted elastomer boot around the can. This configuration, while allowing the convoluted boot to be smaller in diameter at the end of the housing to minimize the amount of lubricating grease required, is expensive to manufacture and is therefore undesirable.

In another trilobal-tripot joint assembly as shown in U.S. Pat. No. 4,795,404, an elastomeric or thermoplastic elastomer (TPE) filler ring is placed between the joint housing and the convoluted boot. This assembly while less expensive than using a metallic can, requires a large housing end on the convoluted boot and a greater amount of lubricating grease. Due to the necessity of making the filler ring pliable enough to seal in a compression type of load and the convoluted boot strong enough to withstand puncture, the clamp is undesirably forced to compress a more rigid material tube down on a more flexible material, in those cases where the boot is formed of PEPBT or similar polymers.

SUMMARY OF THE INVENTION

The present invention is an improved boot assembly and retention means for a constant velocity joint having a trilobal-tripot housing. The boot assembly comprises a sleeve, the sleeve being formed to complementary fit the outer contour of the joint housing. A segmented band has an inner contour to complementary fit the outer contour of the sleeve and has a generally circular outer contour. Clamp means encircles the band for causing the sleeve to grip the joint housing.

The boot is made entirely of high molecular strength polymer material, such as PEPBT as described above, and is partially blow molded and partially injection molded. The sleeve ends of the boot are injection molded, and the three segments of the segmented bands are also injection molded of the same or stiffer material, and have inside surfaces which are configured to be received within the arcuate axial recesses of the sleeve end of the boot. The arcuate ends of the fill segments are formed with interconnected and inter-sliding portions in the form of interfitting tongues and grooves, to permit the transmission of clamping forces to the housing through the boot. The segments of the band may be assembled on the outer conforming surface of the encircling boot by ultrasonic tack welding.

Since the clamping segments are formed of the same material as the convoluted boot, and since the segments are individually free to move into the axially concave outer depression of the joint, the clamping force is effectively transmitted through the segments to the boot itself.

A primary object of this invention is to provide an improved convoluted boot assembly and retention means for sealing a constant velocity joint.

It is another object of this invention to provide a convoluted TPE boot for sealing a trilobal-tripot constant velocity joint or the like.

These and other objects and advantages of the invention will be apparent from the following description, the accompanying drawings and the appended claims.

DESCRIPTION OF THE PREFERRED EMBODIMENT

Figure 1:
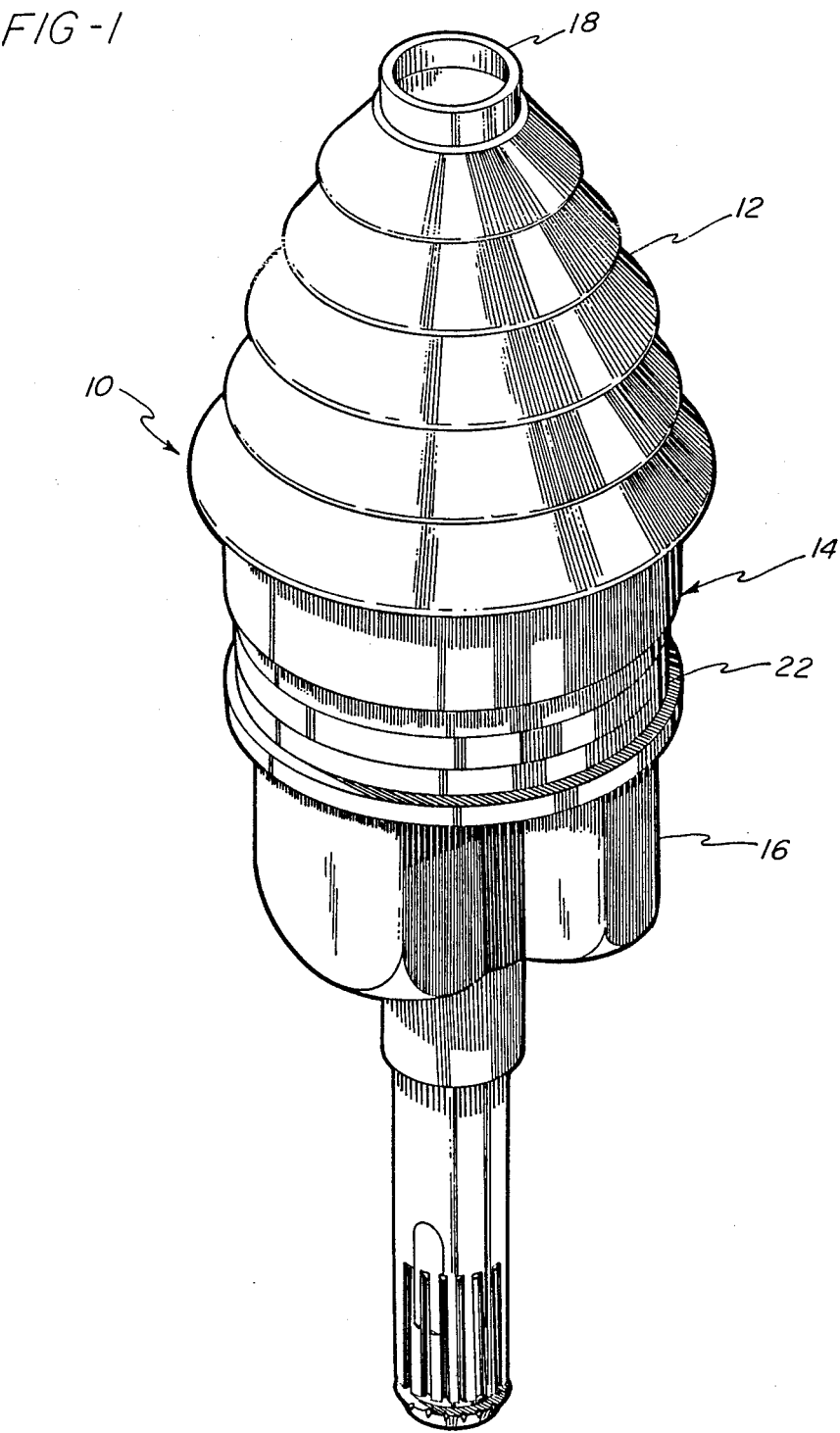
FIG. 1 is a perspective view of a boot and three piece retention band, as assembled on a constant velocity trilobal-tripot joint, and made in accordance with this invention.
Figure 2:
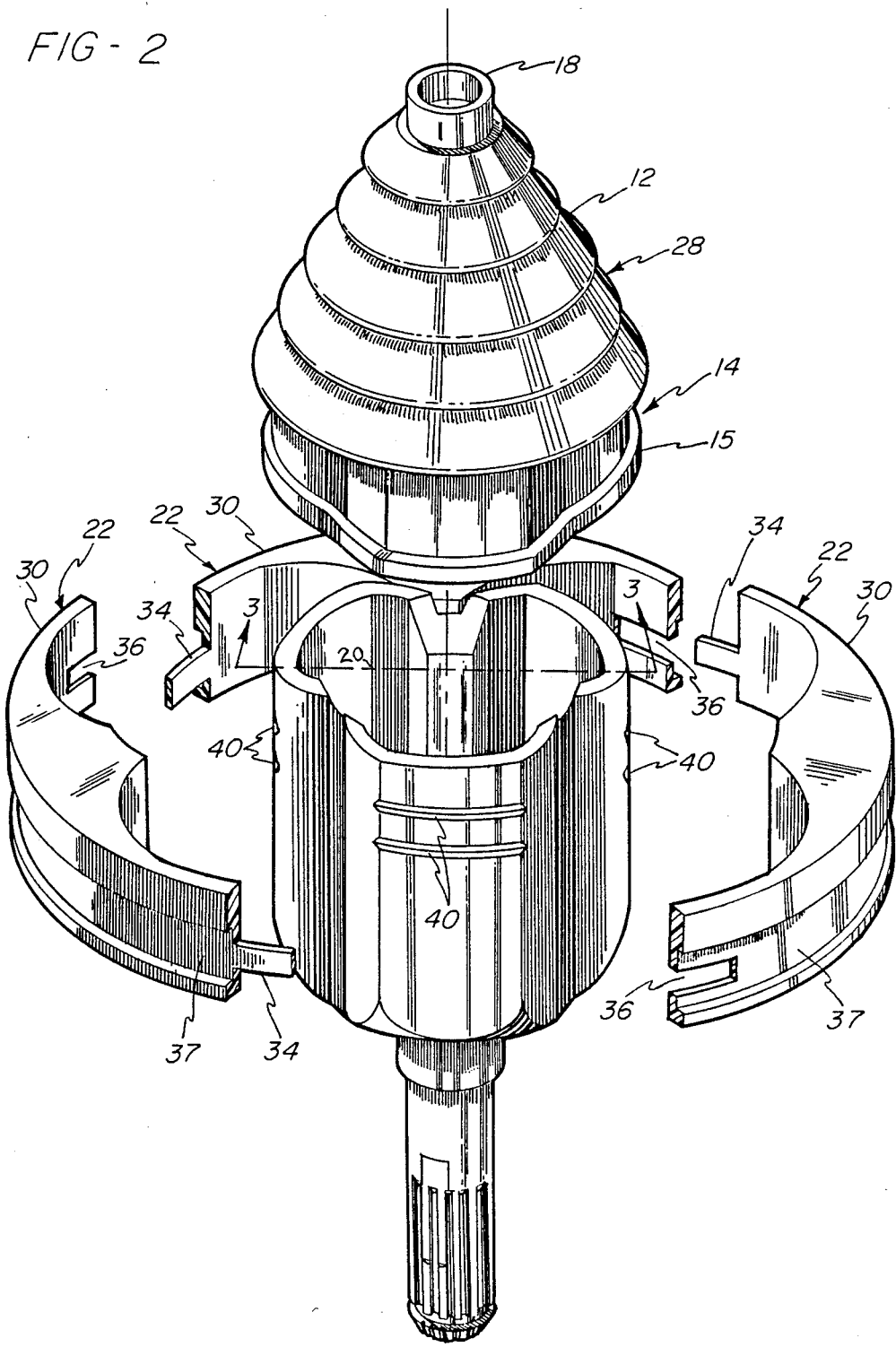
FIG. 2 is an exploded perspective view of the boot and three piece retention band of FIG. 1 showing the tongue and groove configuration.
Figure 3:
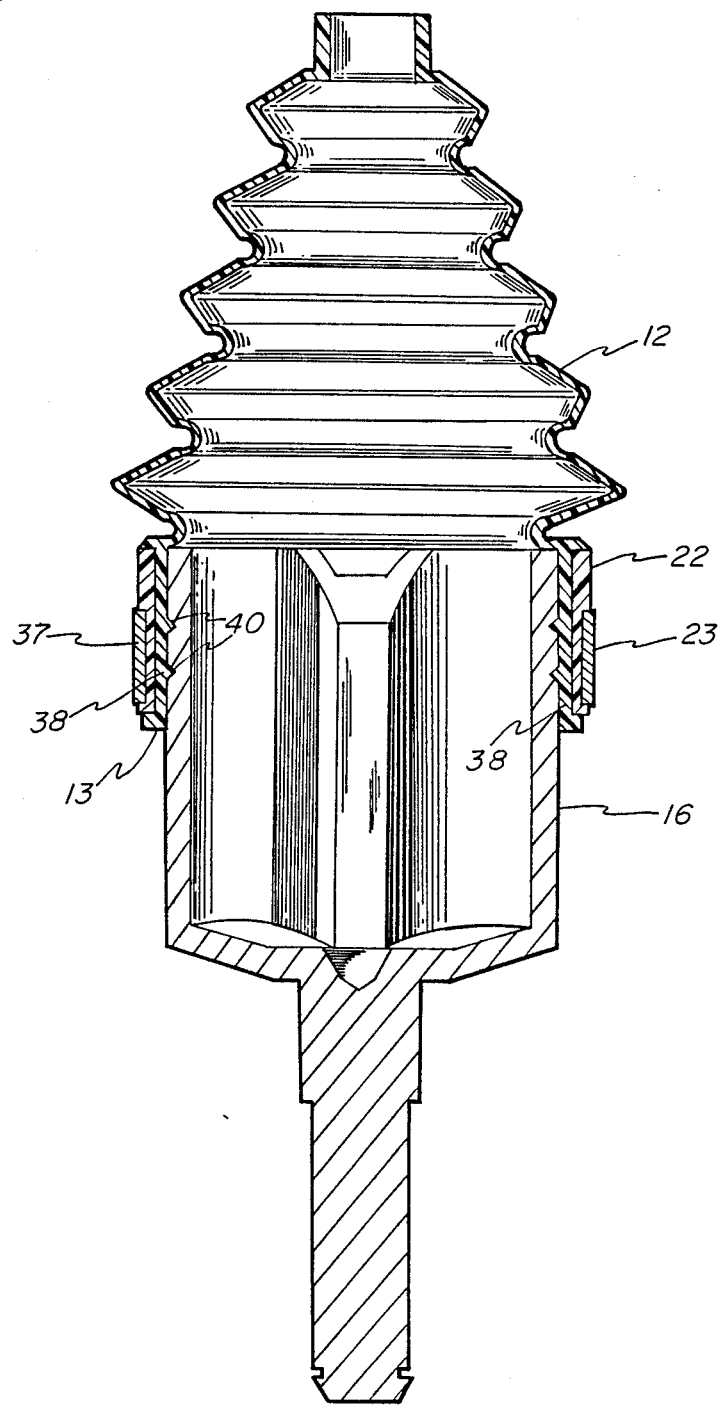
FIG. 3 is a cross-sectional view of the boot and the three piece retention band, as assembled on the constant velocity trilobal-tripot joint, and looking along the line 3—3 of FIG. 2.

A preferred embodiment of the invention is shown in FIGS. 1 through 3. A trilobal-tripot constant velocity (TTCV) joint 10 has a housing 16 defined by three axially extending lobes 16a separated by axially extending generally concave depressions 16b.

The interior mechanism of the joint is not illustrated in order to simplify the drawings. Typical joints are shown in the above-mentioned U. S. Pat. No. 4,795,404 and in the patents cited therein.

The housing 16 is sealed by a flexible polymer boot 12 having at its larger end 14 a sleeve 15 mounted to the housing 16 and a small sleeve 18 at its other end mounted to a drive shaft assembly (not shown) leading from the TTCV joint 10. A three-piece segmented band 22 and an encircling low profile clamp 23 (FIG. 3) encircle the sleeve 15 at the larger end 14 of the boot 12 to cause the sleeve 15 to grip the joint housing 16. A second encircling low profile clamp (not shown) encircles the boot 12 at the smaller end 18 to cause the boot 12 thereunder to grip the drive shaft assembly. The interior space 20 of the sealed TTCV joint 10 is partially filled with grease or other suitable lubricant.

The low-profile clamps are of lightweight design such as shown, for example, in the Oetiker U.S. Pat. No. 3,579,754, although conventional hose-type constricting bands or clamps may be used.

As shown in FIG. 2, the boot 12 further includes a plurality of annular, axially connected individual convolutions 28 extending along the length of the boot 12, between the larger end 14 and the smaller end 18 of the boot 12. The convolutions 28 conventionally provide for flexing of the boot 12 while protecting the TTCV joint 10 from intrusion of dirt and the like.

The boot 12 is formed by injection molding the sleeve 15 at the large end and the large end, and the sleeve 18 at the smaller end, by conventional techniques. The larger sleeve 15 is molded to fit or conform to the outer contour of the TTCV joint housing 16. The convolutions are blow-molded by conventional techniques into the convoluted or bellows shape as shown. Preferably, the boot 12 is made of a thermoplastic elastomer (TPE), although other polymer materials as known in the art may be used. Typical TPE materials which can be used include E. I. du Pont de Nemours and Company "Hytrel", HTG-5612 and Monsanto's "Santoprene" thermoplastic rubber, typically grade 103-40.

As shown in FIGS. 2 and 3, the three-piece segmented band 22 has an outer contour which forms a circle and an inner contour sized and configured to encircle the outside of the joint housing 16 and the correspondingly shaped sleeve 15 of the boot 12. As shown in FIG. 2, the inner contour complements the shape of the housing 16 at the depression 16b. Each identical segment or section 30 of band 22 is injection molded by conventional techniques using the same or a more rigid TPE material as used for the boot 12.

As best shown in FIG. 2, the segmented band sections 30 are connected or joined at their longitudinal ends by complementary tongues 34 and grooves 36. Each segment of section 30 is formed with an arcuately extending tongue 34 at one end and a tongue-receiving groove 36 at its opposite end. The tongue and groove are positioned as extensions of an outer clamp-receiving slot or groove 37 arcuately formed in the outer surface of each section 30. The groove is proportionately longer than any associated tongue, so as to permit the full nesting of each segment into the space between one of the housing lobes when clamped into position.

As shown in FIGS. 1 and 3, during assembly the sleeve 15 of boot 12 is slipped over the joint housing 16 so that circumferential beads 38, which are internally formed on the sleeve 15 of boot 12, are seated in grooves 40 of the joint housing 16. The segmented band sections 30 are longitudinally aligned over the sleeve 15 and housing 16 such that the tongues 34 and grooves 36 intermesh to form the band 22. The segmented band segments 30 are then ultrasonically spot welded to the sleeve 15 and secured in position by the low-profile clamp 23.

The tongue and groove design of the band 22 permits the circumferential movement of the band 22 thereby isolating the clamp from having excessive loads applied thereto by movement of the joint 10.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A boot assembly for a constant velocity joint having a housing and a retention assembly for retaining the boot assembly on the housing, the boot assembly comprising:
   a flexible polymer boot having a sleeve conforming to the contour of the housing,
   a plurality of individual and separate band sections encircling said sleeve,
   means for connecting said band sections to define a circumferentially movable segmented band encircling said sleeve, said segmented band having an inside surface conforming to said sleeve and an outer clamping surface, and
   clamp means encircling said band for causing said sleeve to grip the joint housing.

2. A boot assembly of claim 1 wherein said boot includes more than one blow-molded annular, axially connected individual convolutions.

3. A boot assembly of claim 1 wherein said boot and said band are formed from the same material.

4. A boot assembly of claim 1 wherein said band is ultrasonically spot welded to said boot.

5. A boot assembly of claim 1 wherein said band includes an external clamp retention groove.

6. A boot assembly of claim 1 wherein the joint is a trilobal-tripot constant velocity joint wherein said housing includes three equally spaced lobes.

7. A boot assembly for a constant velocity joint having a housing and retention means for retaining the boot assembly on the housing, the boot assembly comprising:
   a flexible polymer boot having a sleeve conforming to the contour of said housing,
   a segmented band encircling said sleeve, said segmented band having an inside surface conforming to said sleeve and an outside clamping surface, wherein said segmented band includes multiple sections, each section connected together at their longitudinal ends by complementary tongues and grooves,
   clamp means encircling said band for causing said sleeve to grip the joint housing, and
   means for permitting circumferential movement of said band to isolate said clamp means from excessive loads caused by movement of said joint.

8. A boot assembly for a trilobal-tripot constant velocity joint having a trilobal-tripot housing with three equally spaced lobes and retention means for retaining the boot assembly on the housing, the boot assembly comprising:
   a flexible boot having a sleeve, said sleeve being formed to complementary fit the outer contour of the joint housing,
   a segmented band having an inner contour to complementary fit the outer contour of said sleeve and having a generally circular outer contour, wherein said segmented band includes multiple sections, each section connected together at their ends by complementary tongues and grooves, and
   clamp means encircling said band for causing said sleeve to grip the joint housing.

9. A boot assembly for a trilobal-tripot constant velocity joint having a trilobal-tripot housing with three equally spaced lobes and retention means for retaining the boot assembly on the housing, the boot assembly comprising:
   a flexible boot having a sleeve, said sleeve being formed to complementary fit the outer contour of the joint housing,
   a plurality of and separate individual band sections encircling said sleeve,
   means for connecting said individual band sections to define a circumferentially movable segmented band having an inner contour to complementary fit the outer contour of said sleeve and having a generally circular outer contour, and
   clamp means encircling said band for causing said sleeve to grip the joint housing.

10. The boot assembly of claim 9 wherein the circumferential movement of said band isolates said clamp means from excessive loads caused by movement of said joint.

11. A boot assembly of claim 9 wherein said band is ultrasonically spot welded to said boot.

12. A boot assembly of claim 9 wherein said band includes an external clamp retention groove.

13. A boot assembly of claim 9 wherein said flexible polymer boot includes a blow-molded convoluted portion and wherein said sleeve is injection molded.

14. A boot assembly of claim 9 wherein said sleeve and said boot are formed from a polyester elastomer material.

* * * * *